(12) United States Patent
Zhao et al.

(10) Patent No.: US 10,050,932 B2
(45) Date of Patent: Aug. 14, 2018

(54) METHOD, USER NODE AND REMOTE ACCESS SERVER FOR RELEASING ADDRESS

(71) Applicant: ZTE Corporation, Shenzhen (CN)

(72) Inventors: Shen Zhao, Shenzhen (CN); Qingyong Zhai, Shenzhen (CN); Hongtao Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 235 days.

(21) Appl. No.: 14/646,032

(22) PCT Filed: Aug. 14, 2013

(86) PCT No.: PCT/CN2013/081422
§ 371 (c)(1),
(2) Date: May 20, 2015

(87) PCT Pub. No.: WO2014/079235
PCT Pub. Date: May 30, 2014

(65) Prior Publication Data
US 2015/0304277 A1 Oct. 22, 2015

(30) Foreign Application Priority Data
Nov. 20, 2012 (CN) .......................... 2012 1 0472418

(51) Int. Cl.
*G06F 15/16* (2006.01)
*H04L 29/12* (2006.01)
(52) U.S. Cl.
CPC ...... *H04L 61/6059* (2013.01); *H04L 61/2007* (2013.01); *H04L 61/2092* (2013.01)

(58) Field of Classification Search
None
See application file for complete search history.

(56) References Cited

U.S. PATENT DOCUMENTS

| 2004/0174904 A1* | 9/2004 | Kim | H04L 29/12216 370/475 |
| 2006/0133342 A1* | 6/2006 | Zeng | H04W 74/06 370/346 |
| 2008/0043665 A1* | 2/2008 | Jeon | H04W 8/26 370/328 |

(Continued)

FOREIGN PATENT DOCUMENTS

| CN | 101064648 A | 10/2007 |
| CN | 101374098 A | 2/2009 |

(Continued)

OTHER PUBLICATIONS

English Translation of CN101374098, Liu Xixing et al. Published Feb. 25, 2009, 39 pages.*

(Continued)

*Primary Examiner* — Joshua Joo
(74) *Attorney, Agent, or Firm* — Banner & Witcoff, Ltd.

(57) ABSTRACT

A method for releasing an address, a user node and a remote access server are disclosed. The method includes: when releasing an Internet protocol version 6 (IPv6) address, a user node notifying the released IPv6 address to nodes within a scope of a local link. In the above technical scheme, when releasing the IPv6 address generated through a prefix, the user node notifies the released IPv6 address to the nodes within the scope of the local link, which enhances the accuracy of charging, improves the user experience, and plays a role of address resource recovery within the scope of the local link, thereby being able to reuse address resources released by the user in the network.

5 Claims, 3 Drawing Sheets

(56) References Cited

U.S. PATENT DOCUMENTS

| | | | |
|---|---|---|---|
| 2009/0154406 A1* | 6/2009 | Kim | H04L 29/12283 370/329 |
| 2009/0327486 A1* | 12/2009 | Andrews | H04L 29/12207 709/224 |
| 2010/0039956 A1* | 2/2010 | Zheng | H04L 41/0893 370/252 |
| 2010/0103876 A1* | 4/2010 | Aso | H04W 60/005 370/328 |
| 2011/0106947 A1* | 5/2011 | Lin | H04L 29/12216 709/225 |
| 2012/0314624 A1* | 12/2012 | Asati | H04L 61/1511 370/257 |
| 2013/0272304 A1* | 10/2013 | Kamble | H04L 45/74 370/392 |

FOREIGN PATENT DOCUMENTS

| | | |
|---|---|---|
| CN | 101465811 A | 6/2009 |
| CN | 101527671 A | 9/2009 |
| CN | 102752414 A | 10/2012 |
| CN | 103002064 A | 3/2013 |
| WO | 2005104498 A1 | 11/2005 |

OTHER PUBLICATIONS

Narten et al. RFC 4861, Neighbor Discovery for IP version 6 (IPv6), Sep. 2007, 98 pages.*

Supplementary European Search Report of EP 13856914, dated Nov. 25, 2015.

Droms R et al; Dynamic Host Configuration Protocol for IPv6 (DHCPv6); rfc3315 txt, 5. JCT-VC Meeting 96, MPEG Meeting; Mar. 16, 2011-Mar. 23, 2011; Geneva (Joint Collaborative Team on Video Coding of ISO/IEC JTC1/SC29/WG11 and ITU-T SG.16), 102 pages.

International Search Report of PCT/CN2013/081422, dated Nov. 14, 2013.

* cited by examiner

METHOD, USER NODE AND REMOTE ACCESS SERVER FOR RELEASING ADDRESS

TECHNICAL FIELD

The present document relates to an address release technique, and particularly, to a method for releasing an address, a user node and a remote access server.

BACKGROUND OF THE RELATED ART

With the rapid development of the broadband technology and the rapid increase of broadband users, a crisis of Internet Protocol Version 4 (IPv4) address space is long-standing, and this is the major impetus causing the upgrade of Internet Protocol (IP) version. The China's Next Generation Internet (CNGI) demonstration project is a national strategic project, and the main object of the project is to construct a test platform for the next generation of Internet centered on the Internet Protocol Version 6 (IPv6). The start of the project indicates that the IPv6 of our country has entered a substantial development stage. All levels of operators are also aggressively deploying the V6 network, and the V6 broadband access network has gradually stepped into the stage of pre-commercial trials.

A design concept of the IPv6 base protocol is wishing that the V6 network can become a plug-and-play access network, but with regard to parts of operators, it is required to manage addresses in a stateful (i.e. dynamic address allocation) form, thus a Dynamic Host Configuration Protocol for IPv6 (DHCPv6) emerges, which causes that a Stateless Address Auto Configuration (SLAAC) function in a Neighbor Discovery Protocol (NDP) and a DHCPv6 protocol address allocation function coexist in the topology environment of existing IPv6 remote broadband access network.

Nowadays, typical IPv6 access user types provided by popular Broadband Remote Access Server (BRAS) router equipment include: an IPHOST (static dedicated line) user, a DCHPv6 user and an SLAAC user. With regard to different link ways, the DCHPv6 user and the SLAAC user can be divided into an Ethernet link user and a Point-to-Point Protocol Over Ethernet (PPPoE) link user.

Especially in the IPv6 networking, a multi-homed host becomes an increasingly important application scenario. Except for one wired network connection (e.g. the Ethernet), a host may also have one or more wireless connections, such as Bluetooth and 802.11 protocol and so on. Except for being connected with a physical link, a host may also be connected with a virtual network or a tunnel network. For example, except for being directly connected with a public Internet, a host may also be connected with a tunnel private and common network. With regard to an IPv6 transition scenario, one tunnel link may be probably added, for example, hosts may be connected with a 6 to 4 tunnel (RFC3056) network or a configuration tunnel (RFC2893) network.

However, in actual application of the BRAS router equipment, the SLAAC function of the NDP and the DHCPv6 protocol address allocation function are often used to allocate a prefix to the user, thereby triggering the user to generate an IPv6 address according to the prefix. Duplicate Address Detection (DAD) will be performed on an address generated by a new user within a scope of a local link, that is, the multicast of a DAD message is performed within the scope of the local link (FIG. 1 shows an encapsulation format of the DAD message), and it is to wait whether there is a reply. When the address has been online in the local link, a user using the address will reply a Neighbor Advertise (NA) message to a new user who generates the address later (FIG. 2 shows an encapsulation format of the NA message), and informs the new user that the address cannot be used, for the address has been used by the node within the scope of the local link. At this point, the new user sending the DAD message and receiving the NA message replied by the neighbor node needs to mark a duplicate tag on the address generated by the user itself, and waits for manual reconfiguration. If the new user performs the DAD detection for specified times (Note: the default times of DAD detection are different according to the difference of equipment, it must be greater than one time, generally it is to detect three times, and each interval time is one second), an NA message replied by other nodes within the scope of the local link is not received yet, it is proved that there is no conflict for the address within the scope of the local link, that is, the new user can normally use the address. In the process of the new user generating the address according to the prefix allocated by the BRAS router equipment, the new user supports generating more addresses at one time or generating one or more addresses at multiple times according to one prefix, and also supports manually configuring one or more addresses.

The environment as described above belongs to a universal phenomenon when the IPv6 user of the BRAS router equipment performs accessing, especially in an application scenario of prefix sharing. The scenario of prefix sharing can be described as an application scenario that the BRAS router equipment allocates the same prefix to multiple users. Such content of protocol brings tremendous test and difficulty to the user management of the BRAS router equipment. When the user generates one or more addresses, after a user generating an address later receives an NA message with respect to the address, even though the user who is using the address releases the address, the user generating the address later also will not perform DAD detection on the address again and start the address, which causes a waste of address resources; moreover, after the user releases the address, the BRAS router equipment will still perform charging on the user, which causes charging the user incorrectly, and increases unreasonable expenses of the user.

SUMMARY OF THE INVENTION

The technical problem required to be solved by the embodiments of the present invention is to provide a method and device for releasing an address, which can avoid a waste of address resources and charging users incorrectly.

In order to solve the above technical problem, the following technical scheme is adopted.

A method for releasing an address comprises:
  when releasing an Internet protocol version 6 (IPv6) address, a user node notifying a released IPv6 address to nodes within a scope of a local link.

Alternatively, the step of notifying a released IPv6 address to nodes within a scope of a local link comprises:
  the user node sending a neighbor advertise (NA) message to the nodes within the scope of the local link, carrying the released IPv6 address in a target address field of the NA message, and indicating to the nodes within the scope of the local link through a CODE field of the NA message that the IPv6 address in the target address field is the released IPv6 address.

Alternatively, the method further comprises:
the nodes within the scope of the local link comprising a broadband remote access server BRAS;
after receiving the NA message and judging that the IPv6 address in the target address field is the IPv6 address released by the user node according to the CODE field of the NA message, the BRAS stopping a charging operation on the user node.

Alternatively, the method further comprises:
the nodes within the scope of the local link comprising a neighbor user node of the user node;
after receiving the NA message and judging that the IPv6 address in the target address field is the IPv6 address released by the user node according to the CODE field of the NA message, in a case that the IPv6 address released by the user node has been set as a duplicate address, the neighbor user node of the user node resetting the IPv6 address released by the user node as an address that can be used.

Alternatively, the method further comprises:
after judging that the IPv6 address in the target address field is the IPv6 address released by the user node, the BRAS setting the IPv6 address released by the user node as an address that can be used.

A user node comprises an address release unit and a release notification unit, wherein:
the address release unit is configured to: release an Internet protocol version 6 (IPv6) address; and
the release notification unit is configured to: when the address release unit releases the IPv6 address, notify a released IPv6 address to nodes within a scope of a local link.

Alternatively, the release notification unit is configured to notify the released IPv6 address to the nodes within the scope of the local link by means of:
sending a neighbor advertise (NA) message to the nodes within the scope of the local link, carrying the released IPv6 address in a target address field of the NA message, and indicating to the nodes within the scope of the local link through a CODE field of the NA message that the IPv6 address in the target address field is the released IPv6 address.

A remote access server comprises a receiving unit, a judgment unit and a charging unit, wherein:
the receiving unit is configured to: receive a neighbor advertise (NA) message;
the judgment unit is configured to: after the receiving unit receives the NA message, judge whether an Internet protocol version 6 (IPv6) address in a target address field is an IPv6 address released by a user node according to a CODE field of the NA message; and
the charging unit is configured to: when the judgment unit judges that the IPv6 address in the target address field of the NA message is the IPv6 address released by the user node, stop a charging operation on the user node sending the NA message.

Alternatively, the remote access server further comprises an address maintenance unit, wherein:
the address maintenance unit is configured to: when the judgment unit judges that the IPv6 address in the target address field of the NA message is the IPv6 address released by the user node, set the IPv6 address released by the user node as an address that can be used.

A user node comprises a receiving unit, a judgment unit and an address generation unit, wherein:
the receiving unit is configured to: receive a neighbor advertise (NA) message;
the judgment unit is configured to: after the receiving unit receives the NA message, judge whether an Internet protocol version 6 (IPv6) address in a target address field is an IPv6 address released by a user node according to a CODE field of the NA message; and
the address generation unit is configured to: when the judgment unit judges that the IPv6 address in the target address field of the NA message is the IPv6 address released by the user node, in a case that the IPv6 address released by the user node has been set as a duplicate address, reset the IPv6 address released by the user node as an address that can be used.

In the above technical scheme, when releasing an IPv6 address generated through a prefix, the user node notifies the released IPv6 address to the nodes within the scope of the local link, which enhances the accuracy of charging, improves the user experience, and plays a role of address resource recovery within the scope of the local link, thereby being able to reuse address resources released by the user in the network.

PREFERRED EMBODIMENTS OF THE INVENTION

Figure 1:
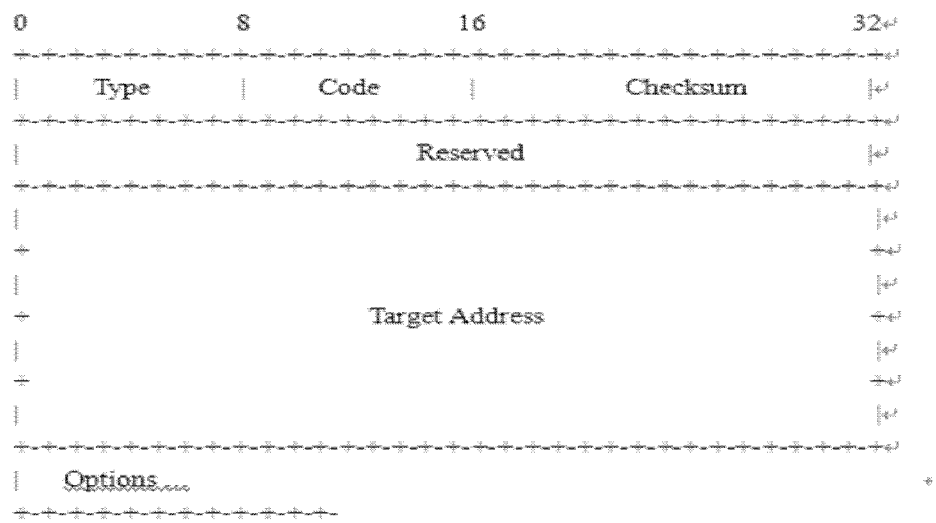
FIG. 1 is a schematic diagram of an encapsulation format of a DAD message in the related art.
Figure 2:
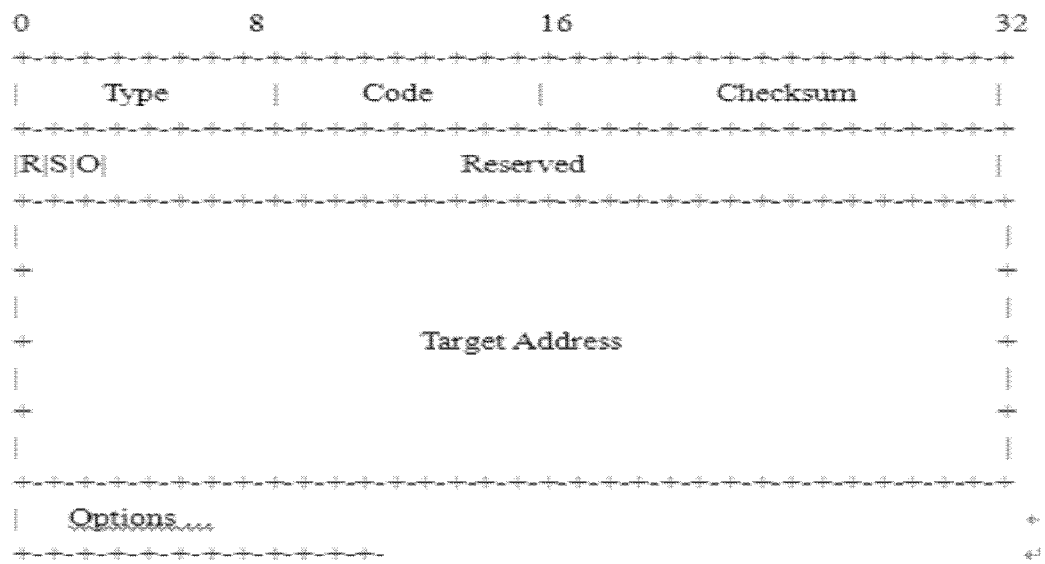
FIG. 2 is a schematic diagram of an encapsulation format of an NA message in the related art.

In the embodiment, when a user (a user node) releases an IPv6 address generated by the user itself or an address manually configured, in considering that the address released by the user will not be announced within the scope of the local link, thus a BRAS fails to know that the user has released an address that is being used and continues to perform charging to the user, other users also fail to know that DAD detection can be performed on an address originally conflicting with the user and the address can be reused.

With respect to a problem that the BRAS equipment still performs charging to the user after the user releases the address and incorrect charging is caused and a problem that a user generating addresses later will not try the address and a waste of address resources is caused, in the embodiment, the user node sends a neighbor advertise message to all nodes within the scope of the local link including the BRAS and other neighbor user nodes when releasing the address, and when the user node initiatively releases a certain IPv6 address, multicast of the NA message is required, an original code (i.e. CODE) field is extended in the fields of the NA message, and it is to indicate to the nodes within the scope of the local link that the IPv6 address in a target address field is the released IPv6 address through the CODE field, and the target address field carries the released IPv6 address; after receiving the NA message in which the CODE field is extended, the BRAS executes the corresponding stopped charging to the above user; and other neighbor user nodes which have conflicting addresses execute operations such as reuse of the released address and so on.

The extended content of the CODE field in the fields of the above NA message includes: when the CODE field is 1, representing that the sent neighbor advertise message is to indicate to all the nodes within the scope of the local link that the IPv6 address in the target address field in the message is the released address.

When the BRAS receives one NA message from the multicast of the node in which an IPv6 address is carried in the target address field, if the CODE field is 1, it is represented that a certain neighbor user node is to release the IPv6 address in the target address field in the NA message, and the BRAS is required to stop the charging operation and so on with respect to the address.

When other user nodes or the BRAS receives one NA message from the multicast of the node in which an IPv6 address is carried in a target address field, if the CODE field is 1, it is represented that there are neighbor user nodes releasing the IPv6 address in the target address field in the NA message, and other neighbor user nodes or the BRAS can use the address and reset the address as an address that can be used.

The BRAS equipment or other neighbor nodes also perform the DAD detection before using an address released by a certain user node, since the user in the local link has released the address, the DAD detection may be successful (that is, there is no conflicting address). The address can be reapplied to other user nodes or the BRAS equipment. If a case of unsuccess still occurs when the DAD detection is performed, it is represented that the address is still conflicting in the link and cannot be reapplied to other users or the BRAS equipment.

The patent document will be described in detail in combination with the accompanying drawings and specific embodiments below. It should be noted that the embodiments in the present invention and the characteristics in the embodiments can be combined with each other in the condition of no conflict.

Figure 3:
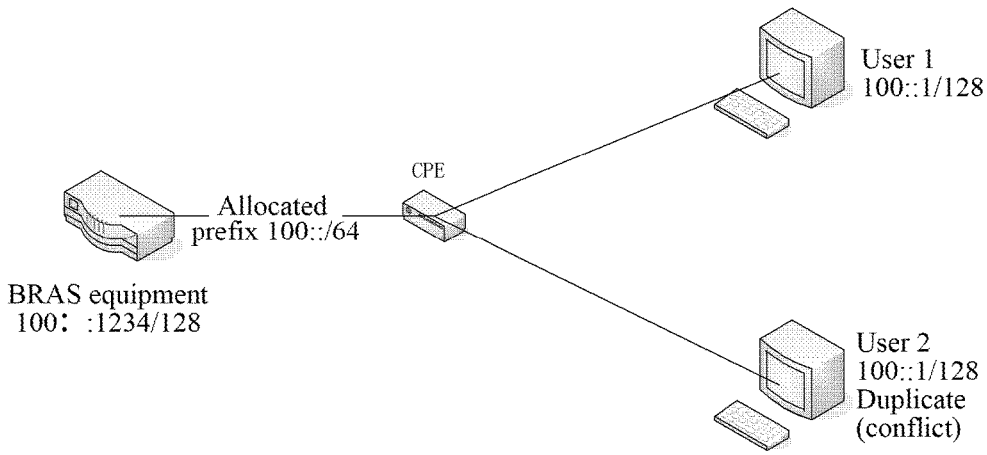
FIG. 3 is a schematic diagram of topology networking of the network applied in the embodiment.
Figure 4:
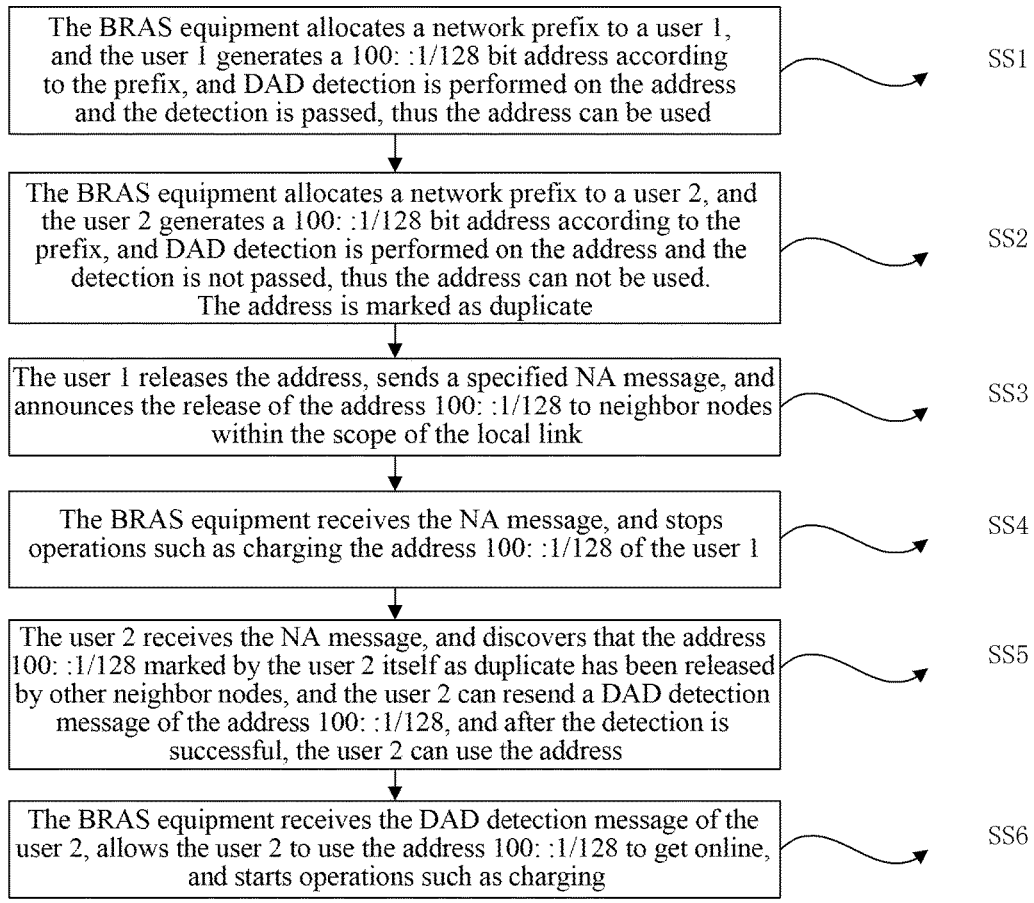
FIG. 4 is a flow chart of a method for releasing an address according to the embodiment.

FIG. 3 is a schematic diagram of topology networking of the network, and FIG. 4 is a flow chart of a method for releasing an address, with reference to FIG. 3 and FIG. 4, the method for releasing the address according to the embodiment includes the following steps.

In step SS1, when a BRAS allocates a prefix 100: :/64 to a user 1, the user 1 generates one IPv6 address 100: :1/128, it is assumed at this point that an address of the BRAS is 100: :1234/128, not conflicting with the user 1, and a user 2 is not in the link at the moment, thus there is no address conflicting with the address generated by the user 1 within the scope of the local link, DAD detection is successful and the user 1 normally uses the address 100: :1/128.

In step SS2, when the user 2 requests the BRAS for a prefix later, the BRAS also allocates the prefix 100: :/64 to the user 2, at this point an address generated by the user 2 according to the prefix is also the 100: :1/128, and the user 2 performs the multicast and sending of a DAD message within the scope of the local link so as to detect whether the user 2 can use the address 100: :1/128, and since the user 1 is using the address, the user 2 sets the 100: :1/128 as a duplicate address.

If the CPE equipment is the common switching equipment, both the BRAS equipment and the user 1 can directly receive the DAD message. When receiving the DAD message and discovering that the content of the target address field in the DAD message is identical with the address of the node itself, the user 1 replies an NA message (a common NA message in which a CODE field is 0, not the extended NA message in the present document) to the user 2 and informs the user 2 of that the generated address has been being used by a certain node within the scope of the local link. At this point, the user 2 sets the address 100: :1/128 as the duplicate address and does not use the address to perform network communication.

If the CPE is the special router equipment (that is, not allowing to perform message intercommunication between the users), the BRAS is required to enable a DAD agent function, and the BRAS acts as the agent for the duplicate address detection of the user 1. In such case, the user 1 cannot receive the DAD message sent by the user 2, but the BRAS can receive the DAD message of the user 2, the BRAS searches and enables the DAD agent function, and knows that the user 1 has used the address, thus the BRAS sends the NA message to the user 2 and informs the user 2 that the generated address has been being used by a certain node within the scope of the local link. At this point, the user 2 sets the address 100: :1/128 as the duplicate address and does not use the address to perform network communication.

In step SS3, when the user 1 releases the address, it is required to send an NA message, a target address field of the NA message is the released IPV6 address, and 1 is written into the CODE field of the message.

In step SS4, when the BRAS equipment receives the NA message, it is indicated that the user 1 releases the address 100: :1/128, at this point the BRAS stops performing charging to the address 100: :1/128 of the user 1.

If the CPE is the common switching equipment, the user 2 can directly receive the NA message; if the CPE is the special router equipment, the BRAS is required to enable a DAD agent function, and when the BRAS receives the NA message, it is required to perform forwarding within the scope of the local link and forward to other user nodes, and the user 2 also can receive the NA message at this point.

In step SS5, when receiving the NA message, the user 2 learns that the address 100: :1/128 has been released within the scope of the local link and the DAD detection can be performed again on the address 100: :1/128 that is generated by the user 2 previously and cannot be used, and it resets the address as an address that can be used, performs DAD detection and uses the address to access the network after the detection is successful.

In step SS6, when receiving the DAD message of the user 2 and learning that the user 2 is using the address now, the BRAS starts to perform charging operation on the address 100: :1/128 of the user 2.

As can be seen from the above description, in the embodiment, it enables the BRAS to effectively manage the IPv6 address, and provides a solution to the problem of the release and recovery of the address generated according to the prefix.

Figure 5:
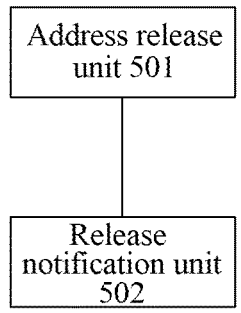
FIG. 5 is a structural diagram of a user node according to the embodiment.

As shown in FIG. 5, the embodiment also provides a user node, which includes: an address release unit 501 and a release notification unit 502, wherein:
  the address release unit 501 is configured to: release an Internet protocol version 6 (IPv6) address; and
  the release notification unit 502 is configured to: when the address release unit 501 releases the IPv6 address, notify the released IPv6 address to nodes within a scope of a local link.

The release notification unit 502 is configured to notify the released IPv6 address to the nodes within the scope of the local link by means of: sending a neighbor advertise (NA) message to the nodes within the scope of the local link, carrying the released IPv6 address in a target address field of the NA message, and indicating to the nodes within the scope of the local link that the IPv6 address in the target address field is the released IPv6 address through a CODE field of the NA message.

Figure 6:
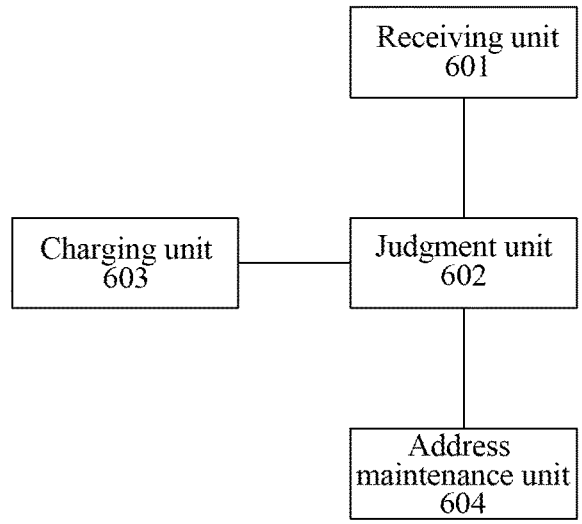
FIG. 6 is a structural diagram of a remote access server according to the embodiment.

As shown in FIG. 6, the embodiment also provides a remote access server, which includes: a receiving unit 601, a judgment unit 602 and a charging unit 603, wherein:

the receiving unit 601 is configured to: receive a neighbor advertise (NA) message;

the judgment unit 602 is configured to: after the receiving unit 601 receives the NA message, judge whether an Internet protocol version 6 (IPv6) address in a target address field is an IPv6 address released by a user node according to a CODE field of the NA message; and the charging unit 603 is configured to: when the judgment unit 602 judges that the IPv6 address in the target address field of the NA message is the IPv6 address released by the user node, stop a charging operation on the user node sending the NA message.

The remote access server also includes an address maintenance unit 604, wherein:

the address maintenance unit 604 is configured to: when the judgment unit 602 judges that the IPv6 address in the target address field of the NA message is the IPv6 address released by the user node, set the IPv6 address released by the user node as an address that can be used.

Figure 7:
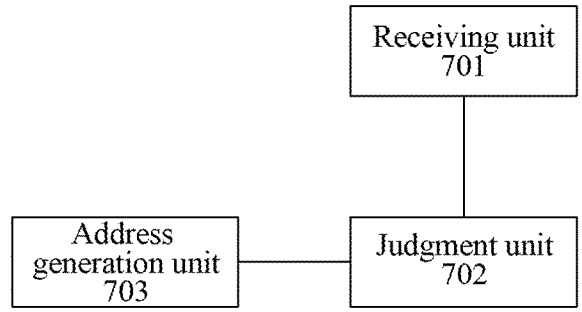
FIG. 7 is a structural diagram of another user node according to the embodiment.

As shown in FIG. 7, another user node provided by the embodiment includes: a receiving unit 701, a judgment unit 702 and an address generation unit 703, wherein:

the receiving unit 701 is configured to: receive a neighbor advertise (NA) message;

the judgment unit 702 is configured to: after the receiving unit 701 receives the NA message, judge whether an Internet protocol version 6 (IPv6) address in a target address field is an IPv6 address released by a user node according to a CODE field of the NA message; and the address generation unit 703 is configured to: when the judgment unit 702 judges that the IPv6 address in the target address field of the NA message is the IPv6 address released by the user node, in a case that the IPv6 address released by the user node has been set as a duplicate address, reset the IPv6 address released by the user node as an address that can be used.

Apparently, the skilled in the art should understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module.

The modules or steps of the patent document can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively or multiple modules or steps of them can be made into a single integrated circuit module to be implemented. Therefore, the patent document is not limited to any combination of hardware and software in a specific form.

The above description is only the preferred embodiments of the present invention, which is not used to limit the patent document. The patent document can have various modifications and changes for the skilled in the art. All the modifications, equivalent substitutions, and improvements, etc. made within the spirit and principle of the patent document shall fall into the protection scope of the patent document.

INDUSTRIAL APPLICABILITY

In the above technical scheme, when releasing an IPv6 address generated through a prefix, the user node notifies the released IPv6 address to the nodes within the scope of the local link, which enhances the accuracy of charging, improves the user experience, and plays a role of address resource recovery within the scope of the local link, thereby being able to reuse address resources released by the user in the network. Therefore the patent document has an extremely strong industrial applicability.

What is claimed is:

1. A method for releasing an address, comprising:
a user node notifying release of an Internet protocol (IPv6) address to nodes within a scope of a local link;
wherein the step of notifying the released IPv6 address to the nodes within the scope of the local link comprises:
the user node sending a neighbor advertise (NA) message to the nodes within the scope of the local link, carrying the released IPv6 address in a target address field of the NA message, and indicating to the nodes within the scope of the local link that an IPv6 address in the target address field is the released IPv6 address through a CODE field of the NA message;
wherein,
at least one of the nodes within the scope of the local link is a neighbor user node of the user node;
after receiving the NA message and judging that the IPv6 address in the target address field is the IPv6 address released by the user node according to the CODE field of the NA message, determining that the IPv6 address released by the user node has been set as a duplicate address, the neighbor user node of the user node resetting the IPv6 address released by the user node as an address that can be used.

2. The method according to claim 1, wherein:
at least one of the nodes within the scope of the local link is a broadband remote access server BRAS; the method further comprising:
after receiving the NA message and judging that the IPv6 address in the target address field is the IPv6 address released by the user node according to the CODE field of the NA message, the BRAS stopping a charging operation on the user node.

3. The method according to claim 2, further comprising:
after judging that the IPv6 address in the target address field is the IPv6 address released by the user node, the BRAS setting the IPv6 address released by the user node as an address that can be used.

4. A remote access server, comprising a hardware processor performing instructions stored in a non-transitory computer readable medium which executes steps in the following units: a receiving unit, an indicating unit, a judgment unit, a charging unit and an address maintenance unit, wherein:

the receiving unit is configured to: receive a neighbor advertise (NA) message; wherein an Internet protocol version 6 (IPv6) address is in a target address field of the NA message;

the indicating unit is configured to: indicate to nodes within a scope of a local link that the IPv6 address in the target address field is the released IPv6 address through a CODE field of the NA message;

the judgment unit is configured to: after the receiving unit receives the NA message, judge whether the IPV6 address in a the target address field is an IPv6 address released by a user node according to a the CODE field of the NA message; and the charging unit is configured to: when the judgment unit judges that the IPv6 address in the target address field of the NA message is the IPv6 address released by the user node, stop a charging operation on the user node sending the NA message; and the address maintenance unit is configured to: when the judgment unit judges that the IPv6 address in the target address field of the NA message is the IPv6 address released by the user node, in a case that the IPv6 address released by the user node has been set as a duplicate address, set the IPv6 address released by the user node as an address that can be used.

5. A user node, comprising a hardware processor performing instructions stored in a non-transitory computer readable medium which executes steps in the following units: a receiving unit, a judgment unit and an address generation unit, wherein:

the receiving unit is configured to: receive a neighbor advertise (NA) message;

the judgment unit is configured to: after the receiving unit receives the NA message, judge whether an Internet protocol version 6 (IPv6) address in a target address field is an IPv6 address released by a user node according to a CODE field of the NA message; and the address generation unit is configured to: when the judgment unit judges that the IPv6 address in the target address field of the NA message is the IPv6 address released by the user node, in a case that the IPv6 address released by the user node has been set as a duplicate address, reset the IPv6 address released by the user node as an address that can be used.

* * * * *